April 20, 1943.　　　　E. S. KAELIN　　　　2,317,065
VALVE
Filed July 24, 1940　　　　2 Sheets-Sheet 1
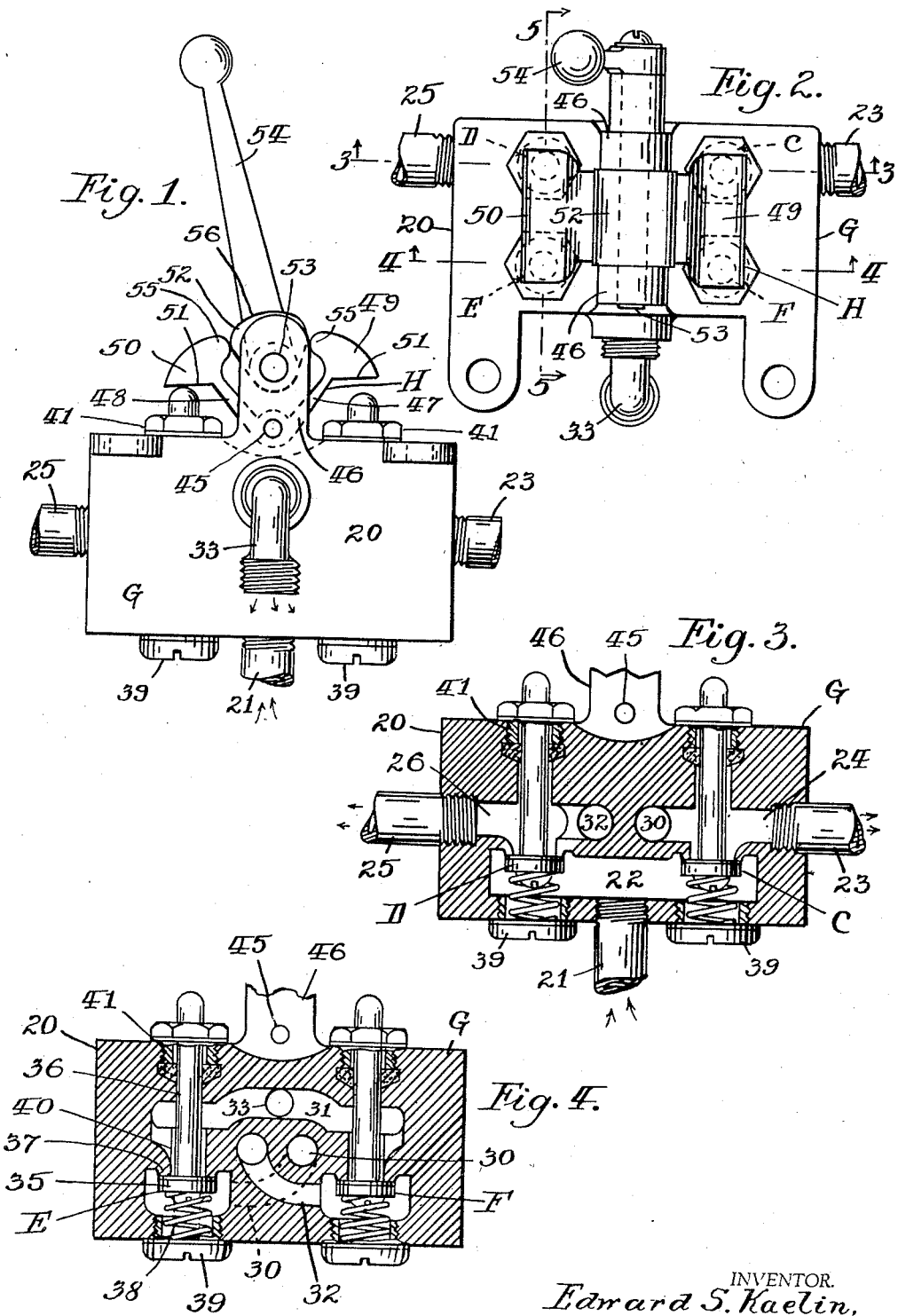
INVENTOR.
Edward S. Kaelin,
BY
ATTORNEY.

April 20, 1943.  E. S. KAELIN  2,317,065
VALVE
Filed July 24, 1940  2 Sheets-Sheet 2

INVENTOR.
Edward S. Kaelin
BY
ATTORNEY.

Patented Apr. 20, 1943

2,317,065

UNITED STATES PATENT OFFICE

2,317,065

VALVE

Edward S. Kaelin, Los Angeles, Calif., assignor to Frederick C. Kingston, Los Angeles, Calif.

Application July 24, 1940, Serial No. 347,159

1 Claim. (Cl. 277—20)

This invention relates to improvements in valves of that type which is used to control the operation of fluid pressure actuated devices. An object of the invention is to provide a valve for controlling the positive driving of a fluid actuated reciprocable member in forward and backward directions and the automatic release of spent fluid. Another object is to control a plurality of sets of valves in a unitary structure so that by driving an operating element in one direction one set of admission and exhaust release valves is opened while an opposite set automatically remains closed and vice versa, and wherein the median position of controlling automatically releases all of the valves into normally closed condition whereby a fluid actuated member can be maintained stationary and in safe condition or reversed at any point of a stroke. Thus by the use of my invention an apparatus may be used for positively and safely applying and controlling a force in opposite directions for various purposes, such as lifting a load, applying braking action and various other uses. A further object is to combine into a unitary structure of small dimensions a simple and effective multiple valve control mechanism which is applicable for a large number of uses. An additional object is the provision of a multiple fluid pressure controlling valve device which is simple in construction, nominal in cost, positive in action, highly efficient in operation, and capable of being operated over extended periods of time with freedom from difficulties.

Figure 6:
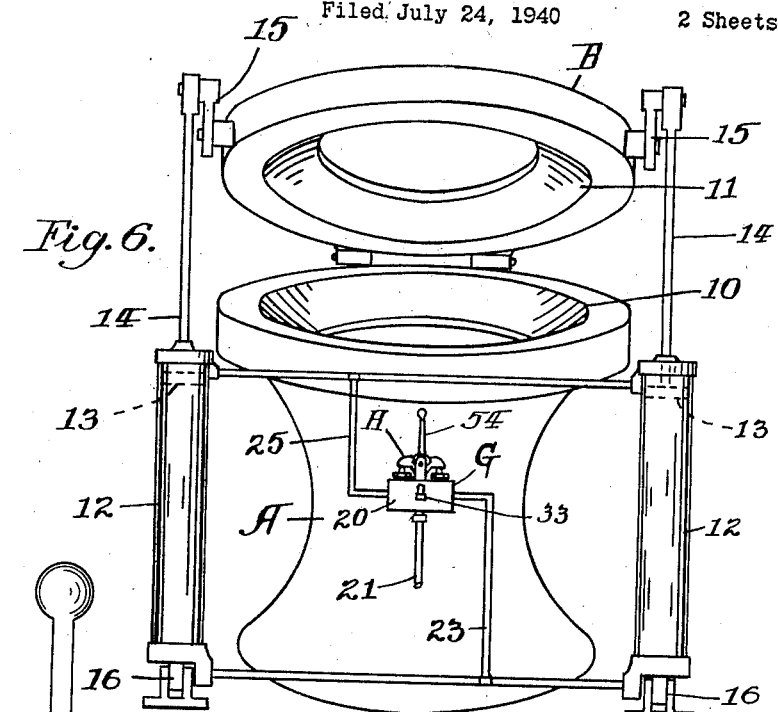
Figure 5:
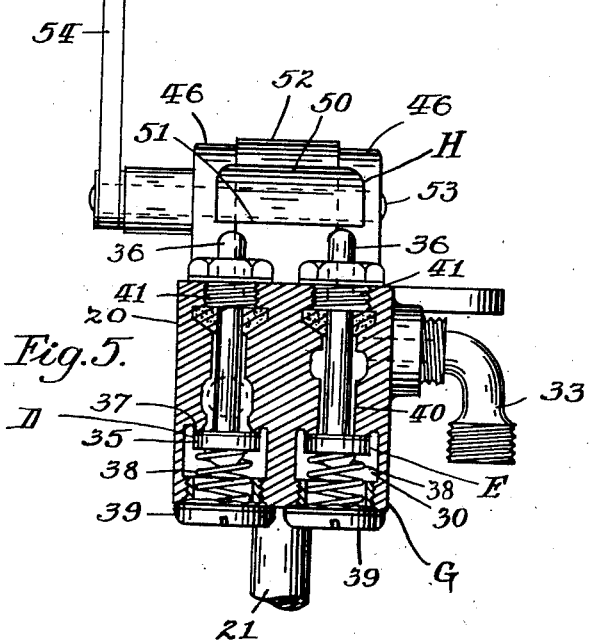

In the accompanying drawings forming part of this specification, Fig. 1 is an elevation looking towards the back of my improved valve device; Fig. 2 is a plan of the structure shown in Fig. 1; Fig. 3 is a vertical longitudinal section taken on the line 3—3 of Fig. 2; Fig. 4 is a vertical longitudinal section taken on the line 4—4 of Fig. 2; Fig. 5 is a cross section taken on the line 5—5 of Fig. 2; Fig. 6 is a diagrammatic view of a tire vulcanizing machine having a fluid pressure pair of rams by which its hinged mold member is positively opened and closed and showing one illustration of many by which my improved multiple fluid pressure valve can be applied in use.

In the drawings, and particularly in Fig. 6, I have shown for illustration purposes only, my improved multiple fluid control valve applied to a tire vulcanizing machine. This machine is shown diagrammatically, and has a body A, containing the lower section 10 of a tire vulcanizing mold and a hinged upper member B containing the upper section 11 of said mold. The upper section B is raised and lowered into open and closed positions by a pair of oppositely disposed rams, each of which consists of an upwardly extending closed cylinder 12 and a piston 13, the latter being reciprocable in said cylinder. Each piston has the usual piston rod 14 extending upwardly and connected to the upper mold section B by a corresponding link 15. The lower end of the cylinder is also mounted upon a hinge support 16, which coacts with the links 15 in compensating the swinging movement of the upper mold section B, when the latter is swung into open or closed position.

G indicates my improved multiple fluid pressure valve which is also shown diagrammatically in Fig. 6, with its housing 20 connected with both cylinders 12 of the rams for controlling the positive reciprocation of the pistons forwardly and backwardly, whereby the vulcanizing machine is positively opened and closed automatically by an evenly applied force on opposite sides of the upper mold section B. A suitable source of fluid pressure supply which may be air, steam, gas, oil or any other fluid under pressure is represented by the fluid pressure conduit 21 leading into the ingress duct 22, in the valve housing. By the use of my improved valve device the fluid is directed either to the lower ends of the cylinders 12 by the branched conduit 23 leading from one end of the valve housing through outlet fluid pressure duct 24, or to the upper ends of the cylinders 12 by the branched conduit 25 leading from the opposite end of the valve housing through outlet fluid pressure duct 26. The connection between ingress supply duct 22 and outlet duct 24 is intercepted by the normally depressed valve C and the connection between ingress supply duct 22 and outlet duct 26 is intercepted by the normally closed depressed valve D, said valves to be hereinafter described. The duct 24 is connected by an exhaust conduit 30 which is normally closed by a depressed valve E, to be hereinafter described, and duct 26 is similarly connected by an exhaust conduit 32, which is also normally closed by a depressed valve F, to be hereinafter described. The two conduits 30 and 32 are interconnected on the outlet side of valves E and F by the duct 31, which has an outlet 33 to the outer atmosphere shown in Fig. 6.

The valves are arranged in pairs or sets, there being one pair consisting of inlet control valve C and outlet control valve F on one side and the other opposite pair consisting of inlet control valve D and outlet control valve E on the opposite side of the valve housing. Thus when the valves C—F are opened by mechanical depression, pressure fluid is admitted into the lower ends of the hoisting cylinders 12 through inlet duct 22 and conduit 23 and the mold section B of the vulcanizing machine is positively swung into elevated position. During this action the upper ends of the actuating cylinders exhaust to the outer atmosphere through conduit 25, ducts 26 and 32, exhaust valve F and outlet ducts 31 and 33. When these valves are closed and the opposite valves D—E are opened by mechanical depression, the reverse action transpires, the pressure fluid entering through inlet duct 22, conduit 25, valve D and the mold section B being positively closed. During this operation the lower ends of the actuating cylinders 12 exhaust to the outer atmosphere through conduit 23, duct 30, exhaust valve E and outlet ducts 31 and 33.

The valves D, E, C and F are all similar in construction. Each consists of a valve head 35 (see Fig. 4), having an upwardly extending valve stem 36. The valve head is urged upwardly into closed position upon its seat 37 by a helical expansion spring 38, said spring being retained in a cupped plug 39 which is threaded into the lower side of the valve housing. This plug is removably seated and is of sufficient diameter to permit the application of the valve to its seat or removal therefrom. The stem reciprocates loosely through the valved connecting passage 40, which connects the conduits in the housing, and slides through and above a suitable packing assembly 41 in the upper portion of the housing. Accordingly, the stems not alone serve as guides but by depressing any one of them the corresponding valve is opened.

The opposite pairs of valves are alternately operated by a rocker yoke H, the median body portion of which is journaled upon a horizontal transverse shaft 45, said shaft being seated between the lower portions of a pair of upwardly extending supports 46. This rocker yoke has two valve depressing arms 47 and 48 (see Fig. 1) the outward ends of which are provided with valve stem depressing heads 49 and 50. These heads are formed with lower faces 51 in juxtaposition over each pair of valve stems so that when the yoke is rocked back and forth first one set of valve stems is depressed and their valves opened, and then the other. A suitable actuating cam 52 is journaled by a shaft 53 between the upper ends of the supports 46, said shaft being reciprocated by an operating lever 54 or any other suitable means desired. The opposed valve stem depressing heads 49 and 50 are shaped with inwardly extending curved cam contacting shoulders 55 (see Fig. 1) and the cam has a double shouldered cam surface 56 so shaped as to contact the cam shoulders of the yoke and positively tilt the arms of the yoke up and down to depress and open first one set of valves and then the other as the yoke is tilted on either side of a vertical plane through the axes of the shafts 45 and 53. The cam shoulder surfaces are connected by a gradually curved cam surface which is also so shaped that toward the extreme tilting movement of the cam in either direction the yoke is locked against unintentional release of the valves from open into closed position. In the median position of the yoke, which as shown is the vertical position of the operating lever, both sets of valves are normally closed. When desired one valve may be advanced in opening ahead of the other, in either or both pairs of valves, by providing one valve stem longer than its companion as shown in Fig. 5. In this manner the exhaust side of the piston in the cylinder can be caused to open ahead of the admission side so as to avoid all tendency to retard the positive reciprocation of the pistons.

By constructing the rocker yoke with upwardly and outwardly extending arms and inwardly protruding cam bearing shoulders 55; by journaling the yoke at the junction of the arms, and by journaling the unitary double cam 52 with its double cam shoulder surfaces juxtaposed in median position between the cam bearing shoulders 55, the structure is materially condensed and confined to a minimum of space which is a distinct advantage.

My improved structure is simple and effective in operation and provides positive control of the valves. It will be noted that ducts 30 and 32 in the self contained valve assembly interconnect the opposite branch conduits so that as the valve device is operated, first one pair of ingress and exhaust valves is opened and the fluid impelled element caused to reciprocate forwardly and when the operation is reversed the remaining pair of ingress and exhaust valves is opened. In the first instance, duct 30 connects the open exhaust outlet in the valve assembly with an intermediate portion of the opposite branch conduit between its pair of normally closed ingress and exhaust valves and thus allows the exhaust to traverse part of the opposite branch conduit in making its exit, and vice versa, in the second instance, duct 32 connects the open exhaust outlet with an intermediate portion of the first branch conduit between its pair of normally closed ingress and exhaust valves and thus allows the exhaust to traverse part of the first branch conduit in making its exit when the valve assembly is reversed. This connecting means provides a single exhaust outlet 33 from the valve assembly which may be conducted away for any purpose desired. This interconnecting of the conduits, cooperating with the normally closed ingress and exhaust valves, provides a positive control of the admission and exhaust of fluid pressure and constitutes one of the important features of my improvement.

In accordance with the patent statutes, I have described the principles of operation of my invention together with the construction thereof which I now consider to represent the best emboiment thereof, but I desired to have it understood that the structure shown is only illustrative and that the invention can be carried out by other means and applied to uses other than those above set forth within the scope of the following claim.

I claim:

In a valve actuating assembly having a body and pairs of normally depressible valve actuating elements, a rocker yoke tiltingly journaled on said body between its ends and having a pair of upwardly and outwardly extending arms each having a head on its outer end, each head having an inwardly protruding cam bearing shoulder face and being broadened laterally sufficiently to provide a lower face of sufficient area to depress a pair of said valve actuating elements, a unitary double cam having a pair of opposed cam surfaces connected by a gradually curved locking surface, said cam being tiltingly poised on said body below and between said heads to condense the structure to within limited space and with its opposed cam surfaces and locking surface juxtaposed and cooperating with said cam bearing shoulder faces of the rocker yoke to tilt the rocker yoke and cause the depression of either one or the other of said pairs of valve actuating elements when the cam is tilted on said body, each of said opposed cam surfaces and said locking surface being so shaped that toward the extreme movement in either tilting direction of the yoke said yoke is locked against unintentional return movement, and means for tilting said double cam on its bearing to cause the functioning of the rocker yoke.

EDWARD S. KAELIN.